United States Patent
Smith (10) Patent No.: US 10,739,017 B2
(45) Date of Patent: Aug. 11, 2020

(54) DETERMINATION OF HYDRONIC VALVE OPENING POINT

(71) Applicant: Computime, Ltd., New Territories (HK)

(72) Inventor: Philip John Smith, Guangdong (CN)

(73) Assignee: Computime Ltd., New Territories (HK)

(*) Notice: Subject to any disclaimer, the term of this patent is extended or adjusted under 35 U.S.C. 154(b) by 40 days.

(21) Appl. No.: 16/105,064

(22) Filed: Aug. 20, 2018

(65) Prior Publication Data

US 2020/0056792 A1    Feb. 20, 2020

(51) Int. Cl.
| | |
|---|---|
| F24D 19/10 | (2006.01) |
| F24F 11/00 | (2018.01) |
| F24F 11/84 | (2018.01) |
| F16K 37/00 | (2006.01) |
| F24D 3/12 | (2006.01) |
| F24F 5/00 | (2006.01) |
| G05B 19/042 | (2006.01) |

(52) U.S. Cl.
CPC ...... *F24D 19/1015* (2013.01); *F16K 37/0083* (2013.01); *F16K 37/0091* (2013.01); *F24D 3/122* (2013.01); *F24F 5/0092* (2013.01); *F24F 11/00* (2013.01); *F24F 11/84* (2018.01); *G05B 19/042* (2013.01); *G05B 2219/25312* (2013.01); *G05B 2219/2648* (2013.01)

(58) Field of Classification Search
CPC .................. F24D 19/1015; F16K 37/0091
See application file for complete search history.

(56) References Cited

U.S. PATENT DOCUMENTS

2018/0058705 A1    3/2018    Ha et al.

FOREIGN PATENT DOCUMENTS

| DE | 102011018698 A1 | 10/2012 |
|---|---|---|
| EP | 2653789 A2 | 10/2013 |
| WO | 2012065275 A1 | 5/2012 |
| WO | 2012116322 A1 | 8/2012 |
| WO | 2017062710 A2 | 4/2017 |

OTHER PUBLICATIONS

Oct. 30, 2019—(WO) International Search Report and Written Opinion—Appl No. PCT/US2019/047123.

*Primary Examiner* — Mark A Connolly
(74) *Attorney, Agent, or Firm* — Banner & Witcoff, Ltd.

(57) ABSTRACT

A controller assembly allows an adjusted flow of water through a hydronic emitter in order to heat or cool an environmental entity. The controller assembly operates in two phases: a calibration phase and an operational phase. During the calibration phase, the controller assembly discovers a valve position where water starts to flow through the hydronic emitter based on signals from a temperature sensor and/or a sound sensor. The temperature sensor may be mounted in close proximity of the emitter inlet so that the controller assembly can detect when the temperature starts to change. The sound sensor may be mounted on the valve body to detect a rushing water sound that is associated with a start of the water flow. The discovered valve position is subsequently used by the controller assembly to adjust water flow between a minimum flow and a maximum flow.

18 Claims, 10 Drawing Sheets

DETERMINATION OF HYDRONIC VALVE OPENING POINT

TECHNICAL FIELD

Aspects of the disclosure relate to calibrating a controller assembly to control water flow through radiators, underfloor heating circuits, chilled beams or fan-coils for a heating/cooling system.

BACKGROUND OF THE INVENTION

Heating/cooling systems with hydronic emitters (including radiators, underfloor heating/cooling circuits, fan coils, chilled beams) are based on power transfer from one or more of the hydronic emitters to affect one or more environmental entities (for example, offices, apartments, conference rooms, and the like). However, traditional approaches do not sufficiently account for the variations of components of the heating/cooling system and consequently may not operate in an efficient manner.

SUMMARY OF THE INVENTION

An aspect supports a controller assembly that provides temperature room control using a high precision movement actuator fitted with an inlet temperature sensor and/or a sound sensor mounted on the associated valve body. After a calibration phase, the controller assembly is able to control the valve over the full range of flow rate from minimum flow to maximum flow based on the power output provided by hydronic emitter such as a radiator, underfloor heating circuit, chilled beam or fan-coil. Consequently, the valve may be adjusted (varied) during the operational phase, through the movement actuator, to obtain an adjusted water flow within the full range resulting in a desired power output from the hydronic emitter.

With another aspect, a controller assembly discovers the actuator position where a valve starts to open to allow water flow during a calibration phase. Without this discovered start point, as may be the case with traditional approaches, the controller assembly may not be able to control water flow over a full range of flow rate when in an operational phase. Various ways may be used to find this point. With some embodiments, a valve is gradually opened with very small movements. After each incremental movement, the controller assembly detects whether a temperature change occurs in the flow pipe. With this approach, a temperature sensor is mounted in a place where heat detection can be quickly discovered. This approach relies upon the water flowing in the pipe being at a different temperature than the static pipe temperature.

With another aspect, a controller assembly detects a change in sound through the pipe/valve when the valve is opened during a calibration phase. This approach does not rely on temperature sensing.

With another aspect, a heating/cooling system comprises a controller assembly that controls the system. The assembly further includes a movement actuator configured to connect to a valve in order to control water flow through a hydronic emitter and a computing device that supports a calibration phase and an operational phase. During the calibration phase, the computing device executes computer-readable instructions that cause the controller assembly to perform: obtaining sensor information from at least one sensor through a sensor interface; controlling, based on the sensor information, the movement actuator to adjust the valve resulting in an essentially minimum water flow through the hydronic emitter; and storing, at a memory device, an actuator position of the movement actuator where the essentially minimum water flow occurs. During the operational phase, the computing device executes computer-readable instructions that cause the controller assembly to perform: controlling an adjustable water flow through the hydronic emitter over a full range of flow rate, wherein the full range spans from the minimum water flow to a maximum water flow and wherein the first actuator position of the movement actuator corresponds to the minimum water flow.

With another aspect, a heating/cooling system performs calibration two or more times, each time obtaining the position of the movement actuator where essentially minimum water flow though the valve is detected. The stored actuator position used during the operational phase may be based on the plurality of position values obtained during the calibration phase. For example, the stored actuator position may be the average of the plurality or may be the minimum of the plurality.

BRIEF DESCRIPTION OF THE DRAWINGS

The foregoing summary of the invention, as well as the following detailed description of exemplary embodiments of the invention, is better understood when read in conjunction with the accompanying drawings, which are included by way of example, and not by way of limitation with regard to the claimed invention.

DETAILED DESCRIPTION

According to an aspect of the embodiments, a controller assembly of a heating/cooling system supports a calibration phase that discovers a point at which a particular valve starts to allow water flow (corresponding to an essentially minimum water flow) through a hydronic emitter. The point where water starts to flow typically varies for different valves even with the same manufacturer and batch. One reason is that water flow starts when the valve seal (for example, a rubber seal) starts to lift, where the occurrence of this event varies from one given valve to another. However, the variability across different valves is typically not as pronounced for a maximum water flow, which occur when the valve is fully opened. The above observation underscores the need for a calibration procedure (phase) to discover the positioning of the actual valve in the heating/cooling system when water starts to flow.

In accordance with the above observation, a fixed position for a valve/actuator controlling water flow typically cannot be used. With a fixed position, some valve/actuators would be closed with no water flowing, and some valve/actuators would be fully opened and not allow precision control of the water flow rate. The calibration phase, in accordance with an aspect of the embodiments, addresses deficiencies of traditional approaches.

Upon completion of the calibration phase, the controller assembly uses the discovered valve position to allow an adjusted flow of water (either heated or cooled) within a full range of water flow through a hydronic water to heat/cool an environmental entity (for example, a room) during an operational phase. The full range spans from a minimum water flow (as discover during the calibration phase) to a maximum water flow. The adjusted flow of water may be linearly or non-linearly related one or more parameters obtained from a thermostat signal, for example a measured room temperature minus a setpoint.

According to another aspect of the embodiments, during a calibration phase a controller assembly receives signals from a temperature sensor mounted in proximity to an inlet of a hydronic emitter. As a valve is advanced in incremental movements from a fully closed position, the controller assembly determines a valve position where water starts to flow though the hydronic emitter by detecting when the temperature reported by the temperature starts to increase or decrease corresponding heating or cooling modes, respectively.

According to another aspect of the embodiments, during a calibration phase a controller assembly receives signals from a sound sensor mounted on a valve body. As the valve is advanced in incremental movements from a fully closed position, the controller assembly determines a valve position where water starts to flow though the hydronic emitter by detecting when a rushing sound of water occurs, which is indicative of a minimum flow of water through the valve.

Figure 1:
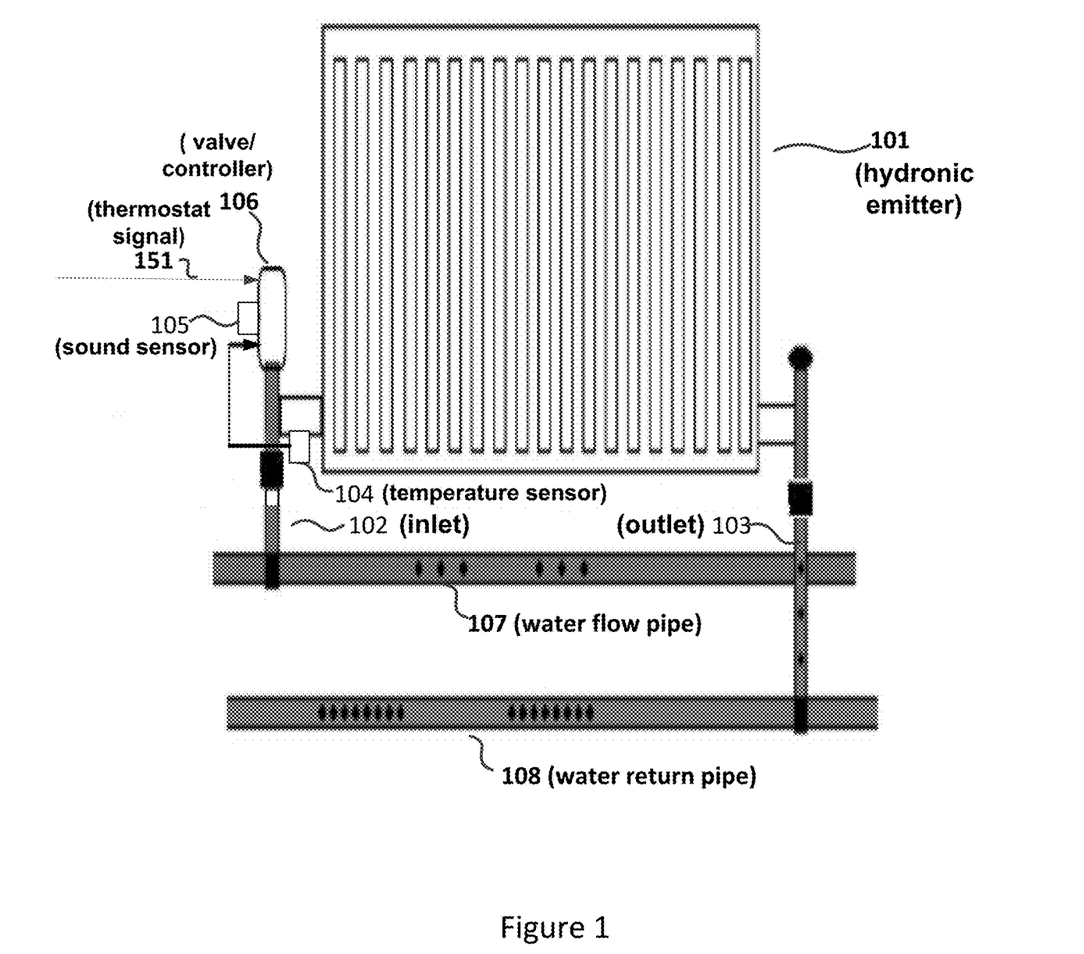
FIG. 1 shows a radiator in accordance with an embodiment.

FIG. 1 shows a radiator in accordance with an embodiment. As will be further discussed, controller assembly 106 controls water flow through hydronic emitter (radiator) 101 via a valve not explicitly shown to allow a flow rate between the minimum and maximum water flow between inlet 102 and outlet 103 when in an operational phase.

Controller assembly 106 may support heating and/or cooling environmental systems. When supporting a heating mode, water flow pipe 107 transports heated water to hydronic emitter 101 through inlet 102. When supporting a cooling mode, water flow 107 transports cooled water. Water return pipe 108 returns the expended water from hydronic emitter 101 through outlet 103.

During a calibration phase, controller assembly 106, adjusts a valve (not explicitly shown) through movement actuator 202 (shown in FIG. 2), measures the inlet temperature through temperature sensor 104, and determines whether a rushing water sound through the valve is detected by sound sensor 105.

As controller assembly 106 advances the valve from a closed position, assembly 106 may detect a temperature change from the inlet temperature and/or a rushing sound of water when the valve starts to open. The position of the movement actuator at the identified event corresponds to a minimum water flow and may be stored in a memory device for subsequent access when controller assembly 106 operates in an operational phase as will be discussed.

When in the operational phase is operating in the heating mode, controller assembly 106 receives a thermostat signal from an associated thermostat (not explicitly shown) that indicates whether the measured temperature of an associated environmental entity (for example, a room) is below a target temperature (for example, a setpoint temperature plus an offset), controller assembly 106 instructs the movement actuator to position the valve to an adjusted position between a minimum flow (corresponding to the stored position as determined during the calibration phase) so that and an adjusted flow of heated water flows through the valve and thusly through hydronic emitter 101. When the target temperature is reached, the valve is closed to stop water flow through hydronic emitter 101.

The adjusted flow may be varied during the operational phase so that the power output provided by hydronic emitter 101 may decrease as the measured temperature as indicated by thermostat 151 approaches a target temperature.

Controller assembly 106 may support a cooling mode when in the operational phase where cooled water flows through hydronic emitter 101 when cooling an associated environmental entity. If so, when controller assembly 106 receives a thermostat signal from an associated thermostat that indicates that the measured temperature of the associated environmental entity is above a target temperature, controller assembly 106 instructs the movement actuator to position the valve to the stored position as determined during the calibration phase so that a minimum flow of cooled water flows through the valve and thusly through hydronic emitter 101.

Controller assembly 106 may connect to temperature sensor 104 and sound sensor 105 in a number of ways. For example, temperature sensor 104 may be separate radio frequency module sensors that report the measured temperatures to controller assembly 106 periodically or by a wired communication.

Figure 2:
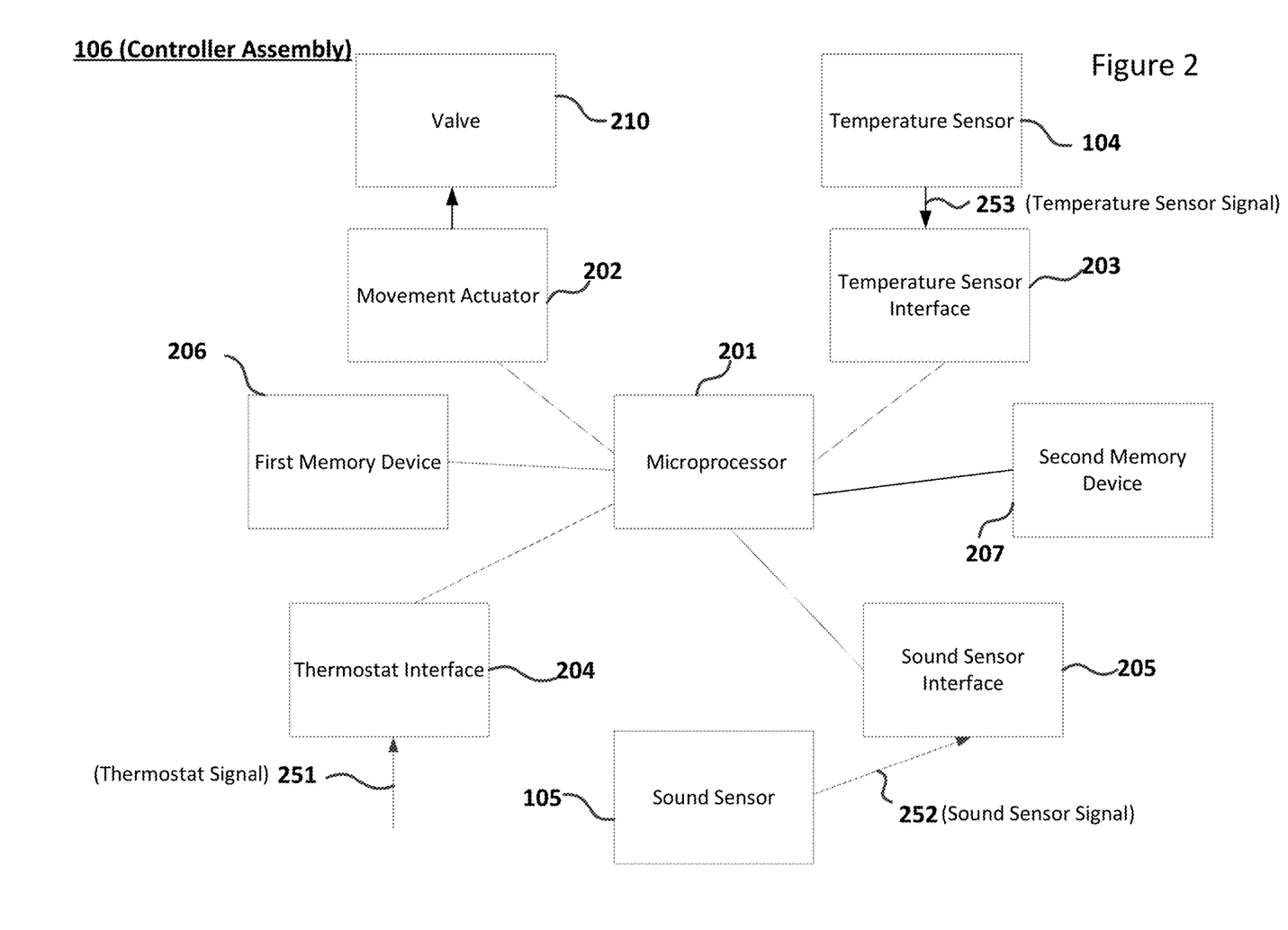
FIG. 2 shows a controller assembly that controls water flow through a hydronic emitter in accordance with an embodiment.

FIG. 2 shows controller assembly 106 that controls water flow through hydronic emitter 101 in accordance with an embodiment.

As discussed previously, controller assembly 106 performs its calibration during the calibration phase before entering the operational phase.

Performing the calibration phase before the operational phase is advantageous with respect to traditional approaches. For example, because of manufacturing tolerances/variations a fixed position for a valve/actuator controlling water flow typically cannot be used. With a fixed position, some valve/actuators would be closed with no water flowing and some valve/actuators would be fully opened and not allow precision control of the water flow rate. With an aspect of the invention, a specific controller assembly with associated valve/actuator is calibrated to determine the valve position where minimum water flow occurs for the specific controller assembly. Calibration may be repeated when the controller assembly is replaced or when the configuration settings are lost or corrupted.

During the calibration phase, processor 201 advances valve 210 through movement actuator 202 from its fully closed position (corresponding to a minimum actuator position) until an essentially minimum water flow is detected through hydronic emitter 101. Detection is based on sound sensor signal 252 from sound sensor 105 through sound sensor interface 205 and/or temperature sensor signal 253 from temperature sensor 104 through temperature sensor interface 203.

With some embodiments, movement actuator 202 may comprise a precision motor drive that drives a valve shaft of valve 210 as instructed by processor 201.

As processor 201 advances valve 210 by incrementally increasing the actuator position, processor 201 processes signal 252 and/or signal 253. Consequently, processor 201 detects when the essentially minimum water flow occurs when a rushing water sound is identified and/or the inlet water temperature changes as water starts to flow through hydronic emitter 101. A rushing water sound is characteristic when water starts to flow through valve 210.

When processor 201 detects the essentially minimum water flow, processor 201 stores the actuator position at the detected event at second memory device 207. The stored position value can be accessed when controller 106 is subsequently operating in the operational phase.

During the operational phase, controller assembly 106 obtains thermostat signal 251, which may be indicative of the temperature setpoint and current room temperature, via thermostat interface 204. Controller assembly 106 may receive signal 251 through various communication media, including wireless or wired channels using different communication protocols.

When controller assembly 106 determines that water flow through hydronic emitter 101 should occur based on thermostat signal 251 during the operational phase, processor 201 instructs movement actuator 202 to position valve 210 to an adjustable position to obtain an adjusted flow between the minimum flow and the maximum flow so that emitter provides the desired power output.

Processor 201 processes signals 252 and/or 253 during the calibration phase and signal 251 during the operational phase in accordance with computer readable instructions obtained from memory device 206. For example, the computer readable instructions may reflect flowcharts 400, 401, 402, 700, and 900 shown in FIGS. 4, 5, 6, 7, and 9, respectively, during the calibration phase and flowchart 1000 shown in FIG. 10 during the operation phase. Based on information obtained from signals 252 and/or 253, processor 201 determines the positioning of valve 210 to allow minimum water flow during the calibration phase. Based on information obtained from signal 251, processor 201 determines when to allow an adjusted water flow through hydronic emitter 101 during the operational phase.

With reference to FIG. 2, the computing system environment may include a computing device where the processes (for example, process 300 shown in FIG. 3) discussed herein may be implemented. The computing device may include processor 201 for controlling overall operation of the computing device and its associated components, including RAM, ROM, communications module, and first memory device 206. The computing device typically includes a variety of computer readable media. Computer readable media may be any available media that may be accessed by computing device and include both volatile and nonvolatile media, removable and non-removable media. By way of example, and not limitation, computer readable media may comprise a combination of computer storage media and communication media.

Computer storage media may include volatile and nonvolatile, removable and non-removable media implemented in any method or technology for storage of information such as computer readable instructions, data structures, program modules or other data. Computer storage media include, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by the computing device.

Communication media typically embodies computer readable instructions, data structures, program modules or other data in a modulated data signal such as a carrier wave or other transport mechanism and includes any information delivery media. Modulated data signal is a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

With some embodiments, memory devices 206 and 207 may be physically implemented within a single memory device.

Figure 3:
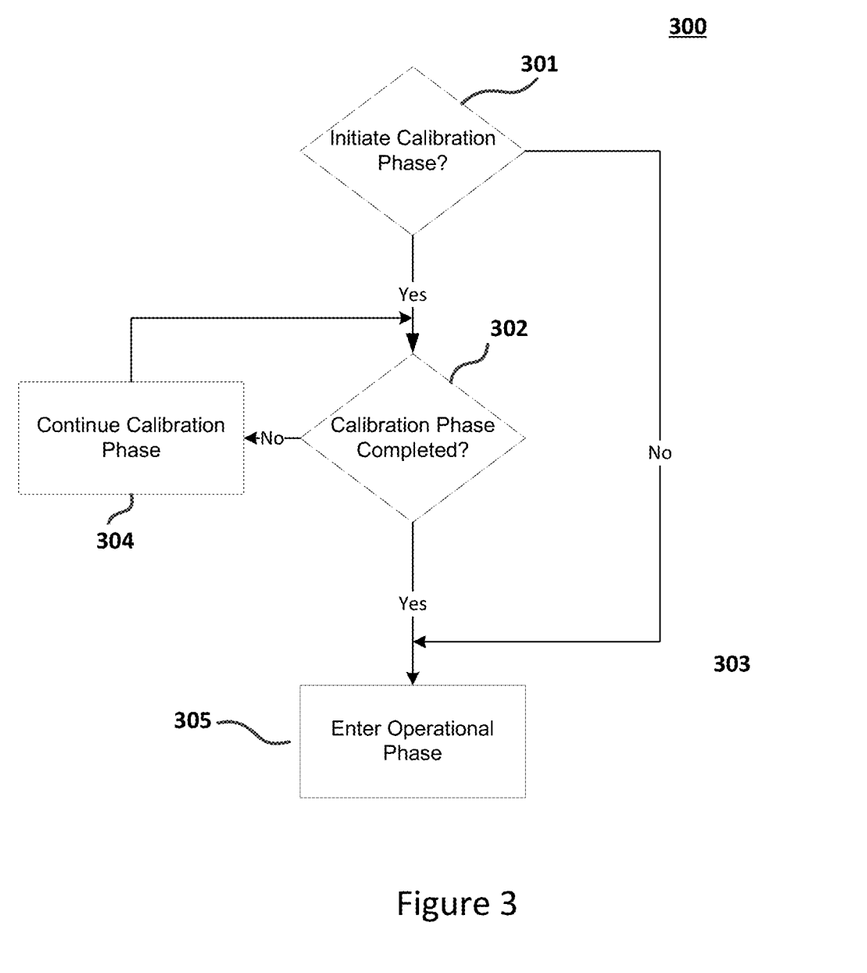
FIG. 3 shows a flowchart for controlling water flow through a hydronic emitter by the controller assembly shown in FIG. 2 in accordance with an embodiment.

FIG. 3 shows flowchart 300 for controlling water flow through a hydronic emitter by the controller assembly shown in FIG. 2 in accordance with an embodiment. Process 300 supports both the calibration phase and the operational phase.

Figure 4:
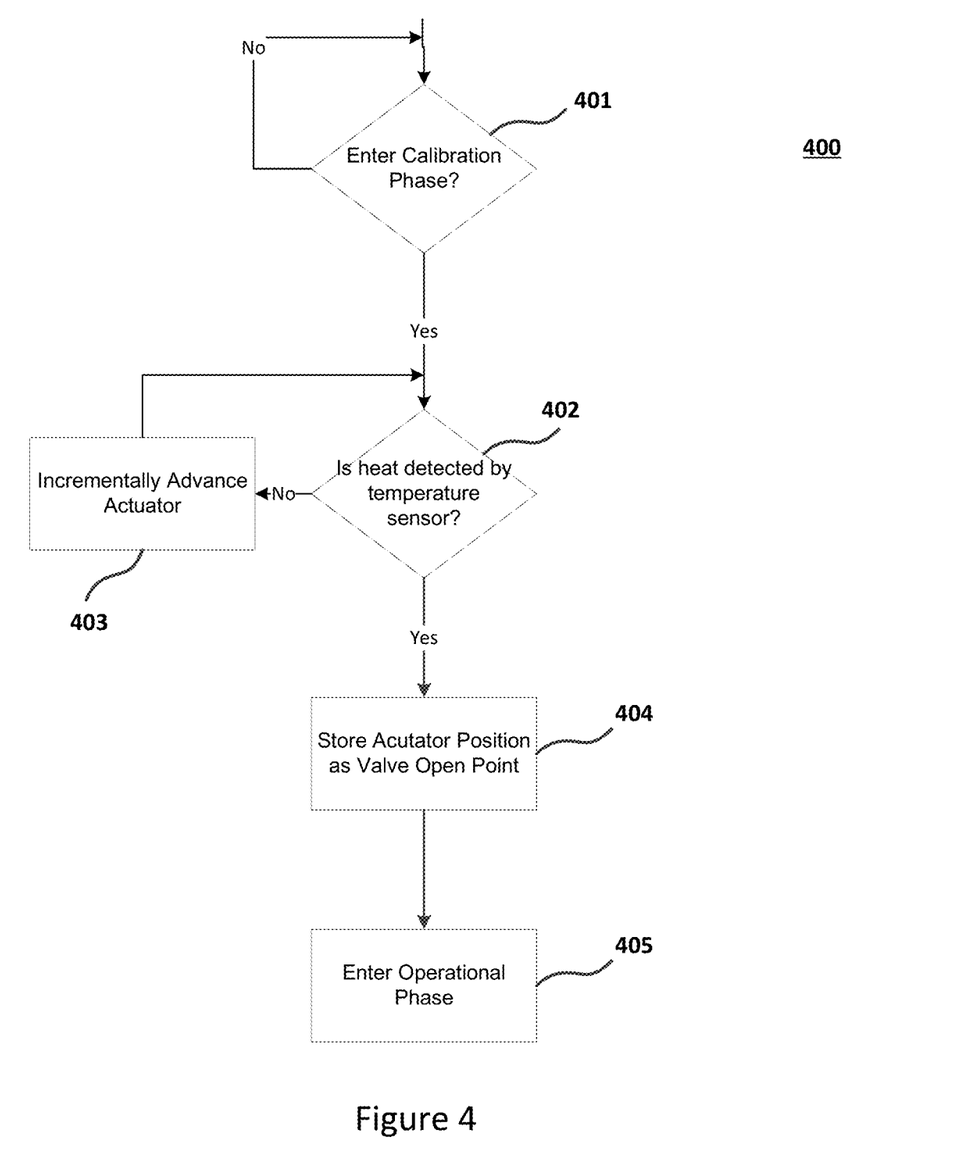
FIG. 4 shows a flowchart for a calibration phase of the controller assembly shown in FIG. 2 in accordance with an embodiment.
Figure 7:
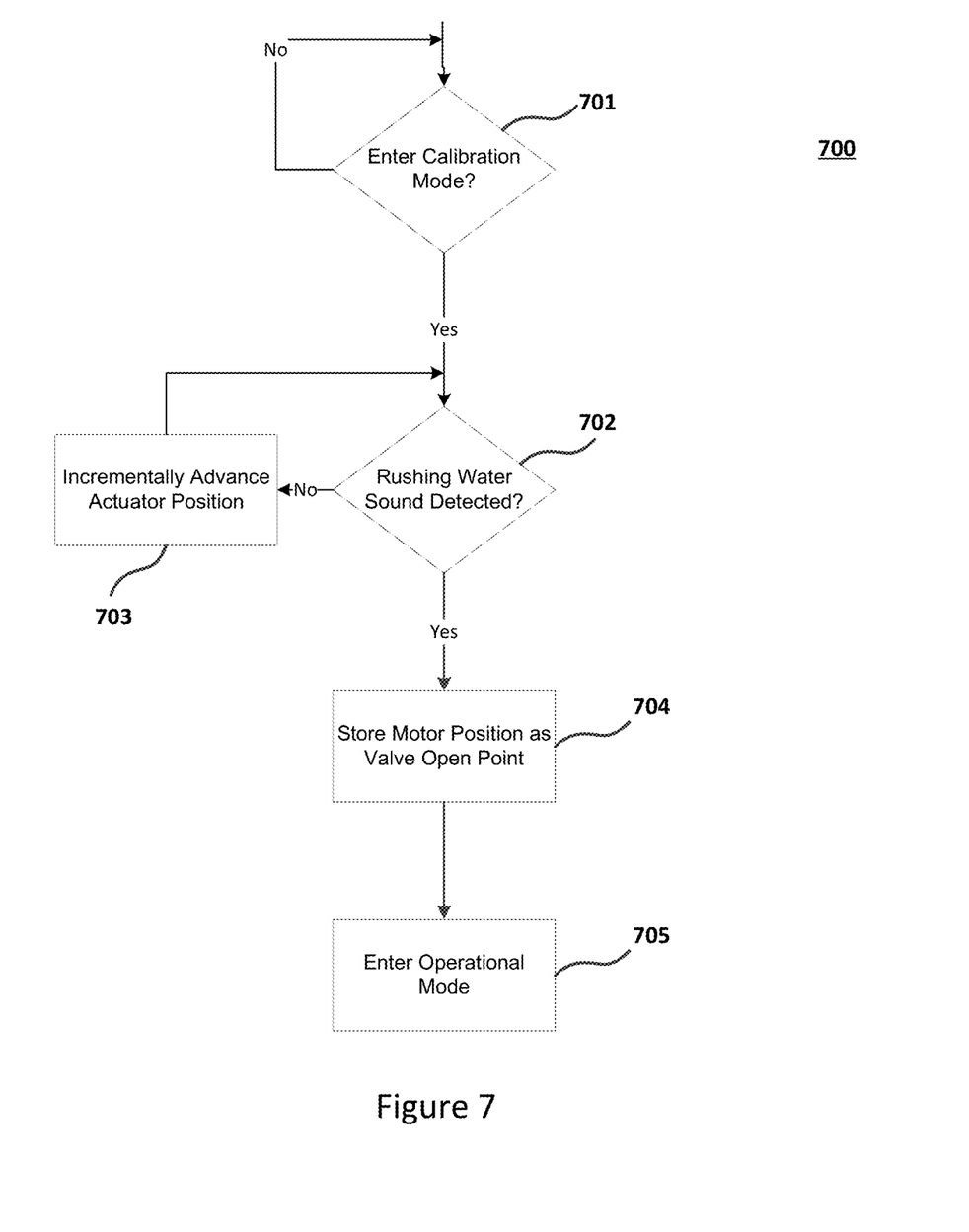
FIG. 7 shows a flowchart for a calibration phase of the controller assembly shown in FIG. 2 in accordance with an embodiment.
Figure 9:
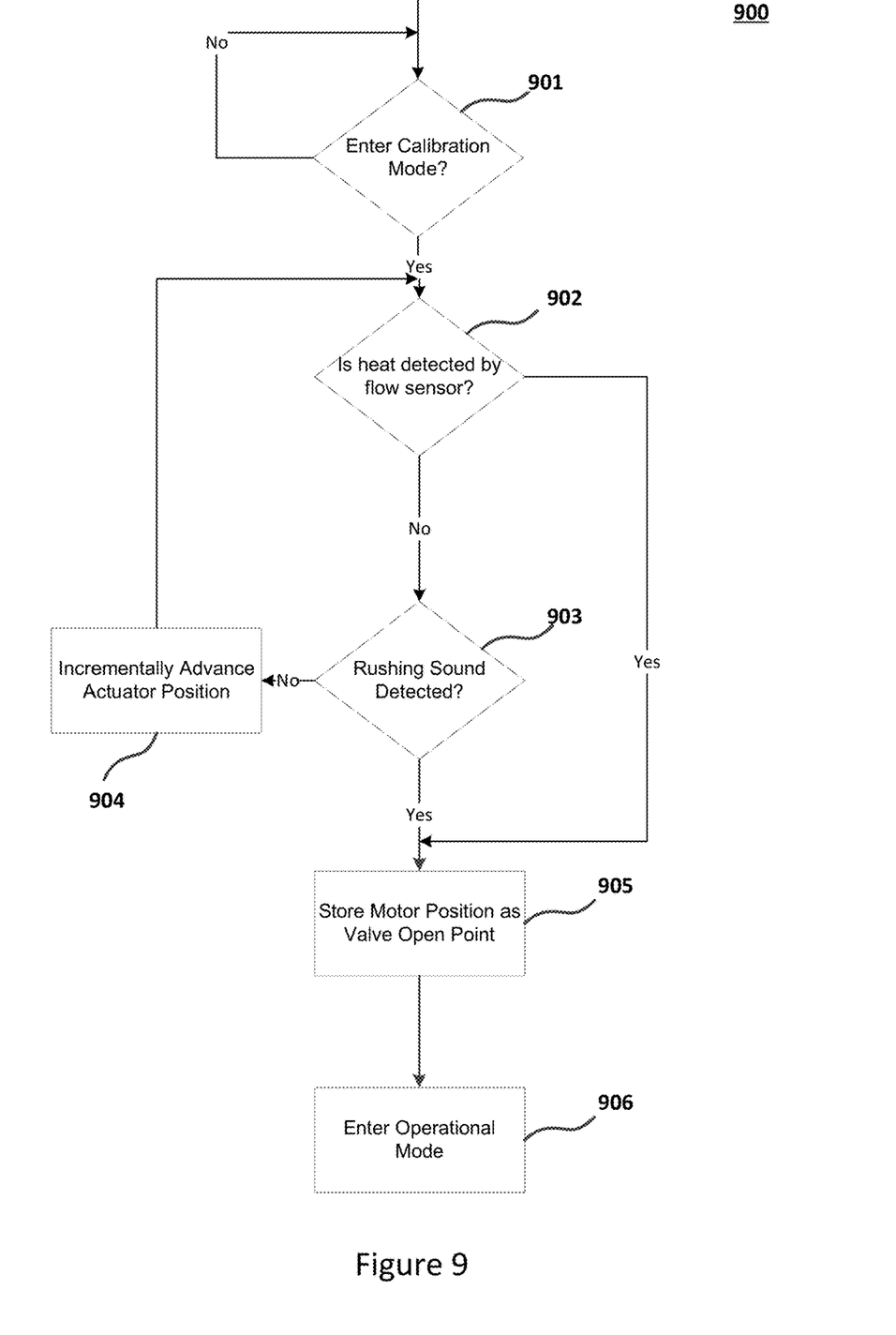
FIG. 9 shows a flowchart for a calibration phase of the controller assembly shown in FIG. 2 in accordance with an embodiment.

At block 301, process 300 determines whether to initiate the calibration phase. For example, the calibration phase may be initiated when controller assembly 106 is installed and/or when a user initiates calibration via a command through an associated thermostat via thermostat interface 204. If the calibration phase is initiated, process 300 proceeds to block 304 and continues executing block 304 until block 302 determines whether calibration has completed. As will be discussed, different embodiments for calibration are shown in FIGS. 4, 7, and 9. When calibration has been completed, the actuator position corresponding to a minimum water flow has been determined and stored in memory for later access.

Figure 10:
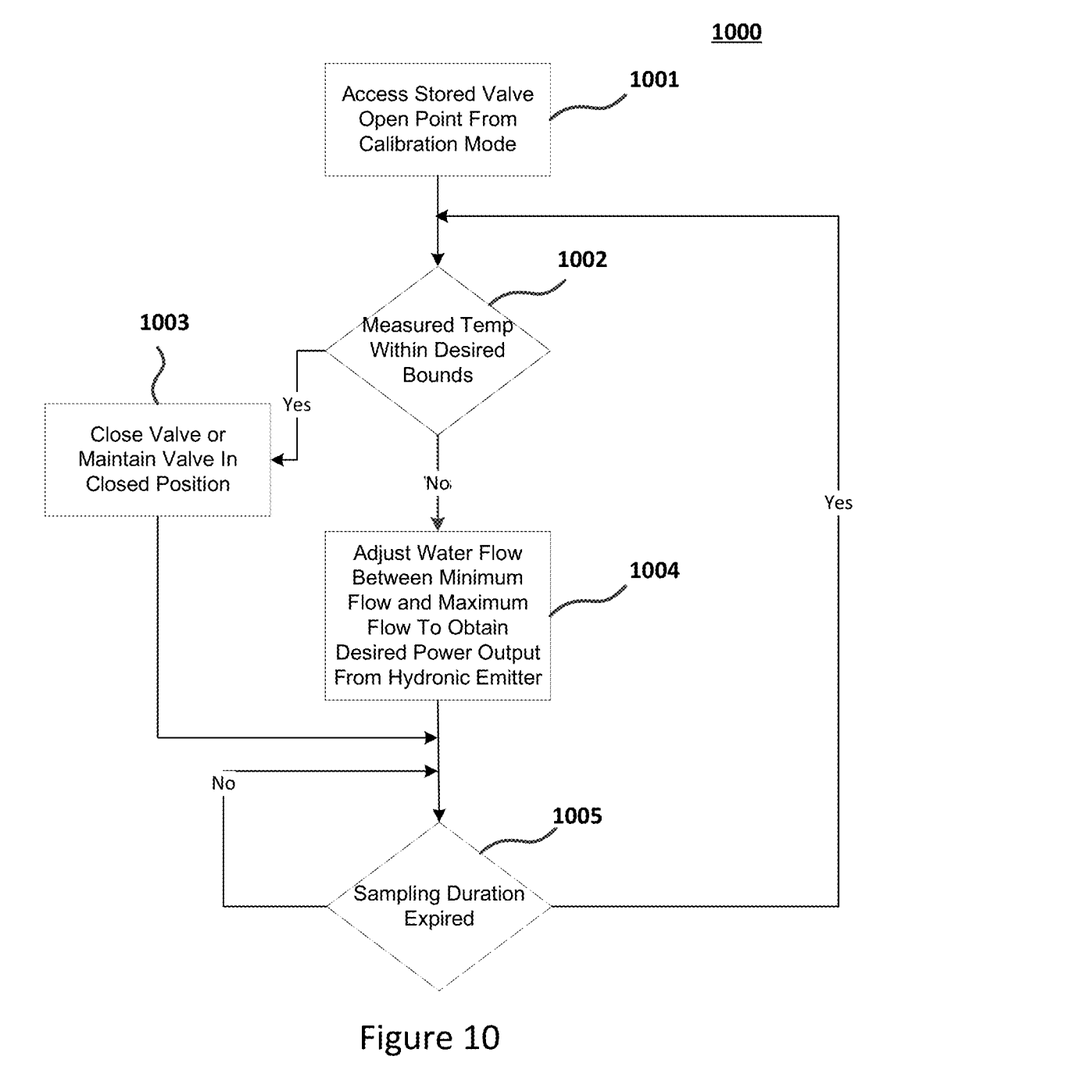
FIG. 10 shows a flowchart for an operational phase of the controller assembly shown in FIG. 2 in accordance with an embodiment.

When calibration has been completed, as determined at block 302, controller assembly 106 enters into the operational phase at block 305. An embodiment for the operational phase is shown in FIG. 10.

If calibration is not initiated at block 301 (for example, calibration has previously been completed), process 300 proceeds directly to the operational phase at block 305.

FIG. 4 shows flowchart 400 for a calibration phase of controller assembly 106 shown in FIG. 2 in accordance with an embodiment. Process 400 determines the actuator position corresponding to minimum water flow by sensing then the temperature starts to change as the valve is advanced from the completely closed position.

Figure 5:
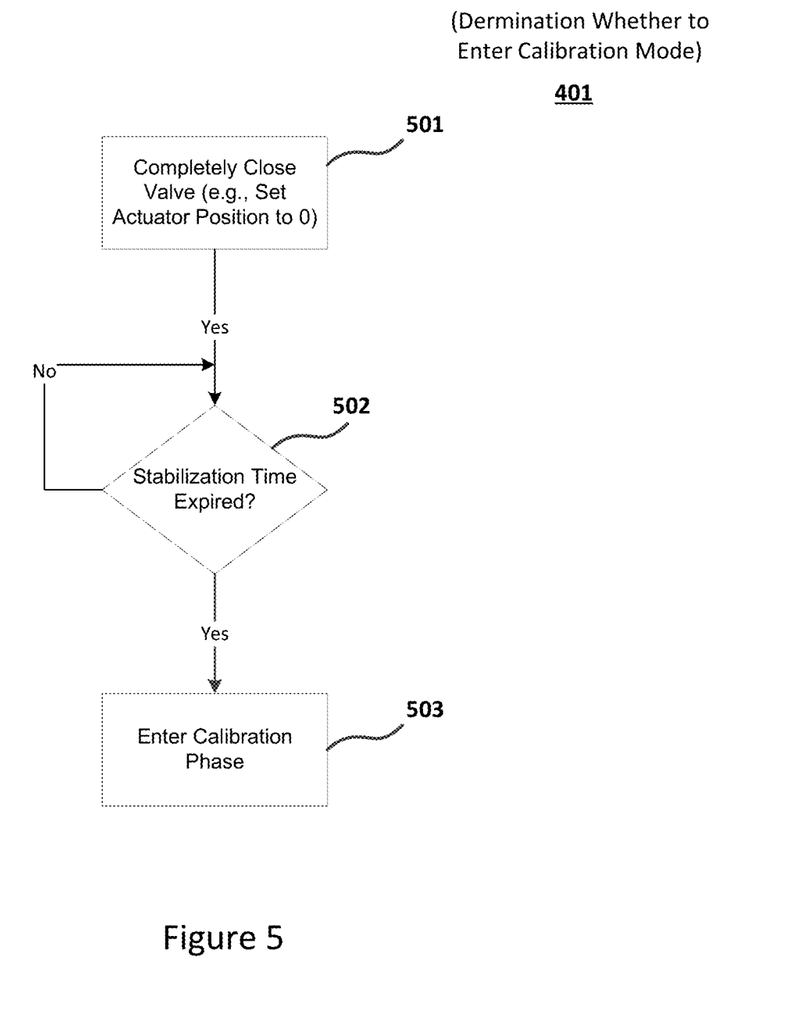
FIG. 5 shows a flowchart for determining when to enter the calibration phase shown in FIG. 4 in accordance with an embodiment.

Process 400 determines when to enter the calibration phase at block 401. Referring to FIG. 5, in order to do so, the valve is completely closed at block 501 corresponding to movement actuator 202 having a minimum position. At block 502, controller assembly 106 than waits for a time duration (for example, a predetermined time duration) for the temperature at inlet 102 to stabilize. Then controller assembly 106 enters the calibration phase at block 503.

Referring back to FIG. 4, at block 402 controller assembly 106 determines whether heat is detected by temperature sensor 104 when in the heating mode as the valve is advanced. Heated water starts to flow (corresponding to minimum water flow) when heat is first detected.

Some embodiments support a cooling mode, in which cooled water rather than heated water flows through emitter 101. When so, controller assembly 106 determines whether reduced temperature is detected by sensor 104. Cooled water starts to flow when the temperature measured by temperature sensor 104 starts to decrease.

Figure 6:
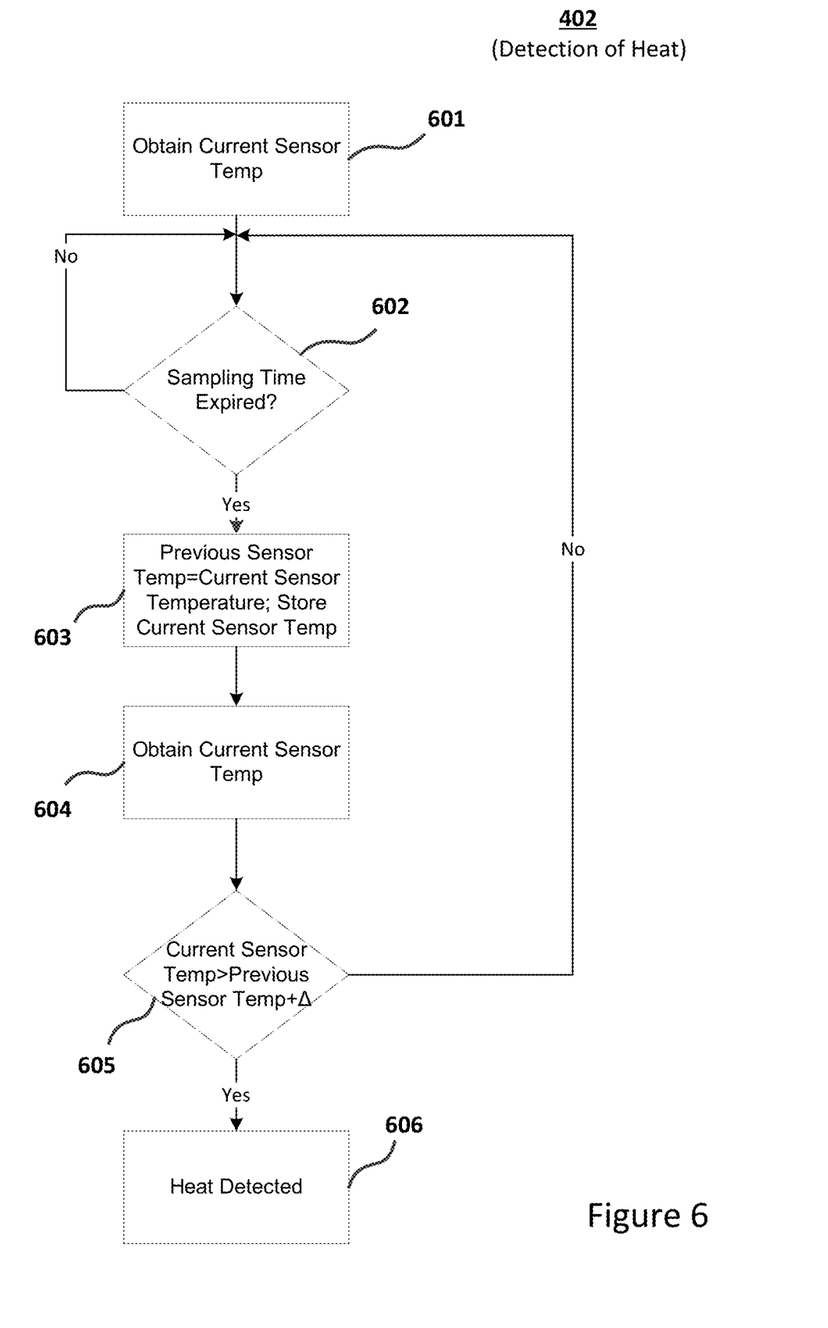
FIG. 6 shows a flowchart for detecting heat during the calibration phase shown in FIG. 4 in accordance with an embodiment.

FIG. 6 shows a flowchart for detecting heat at block 402. At block 601, controller assembly 106 obtains the current inlet temperature measured by temperature sensor 104. After a sampling time duration as determined by block 602, the previous temperature is replaced by the current temperature at block 602. The current temperature is then updated at block 603.

At block 605, if the current temperature exceeds the previous temperature by delta (which may be a predetermined temperature increment), then controller assembly 106 detects heat at block 606. Otherwise, the process is repeated by returning to block 602.

Referring back to FIG. 4, at block 402, if heat is detected, the actuator position is stored for subsequent access at block 404 and the operational phase is entered at block 405. If heat is not detected at block 402, movement actuator is advanced by an incremental amount at block 403 and block 402 is then repeated.

FIG. 7 shows flowchart 700 for a calibration phase of the controller assembly 106. Rather than detecting heat to determine then valve 210 starts to open, process 700 detects a rushing water sound.

Block 701 determines when to entry the calibration process in accordance with the process shown in FIG. 5. For example, movement actuator 202 is positioned into a fully closed position, where the actuator is at a minimum position. Subsequently, the actuator position can be increased incrementally until water starts to flow through the valve.

Block 702 receives an indication whether a rushing water sound is detected by sound sensor 104. If so, the actuator position is stored for subsequent access at block 704 and the operational phase is entered at block 705. Otherwise, the position of movement actuator 202 is incrementally increased and block 702 is repeated until a rushing water sound is detected by sound detector 104.

With some embodiments, blocks 702-703 may be repeated a plurality of times, each time obtaining the position of the movement actuator where essentially minimum water flow though the valve is detected. The stored actuator position that the operational phase uses may be based on the plurality of position values obtained during the calibration phase. For example, the stored actuator position may be the average of the plurality or may be the minimum of the plurality. As another example, when a difference between repeated actuator positions exceed a predetermined limit, controller assembly 106 may generate an error signal.

With some embodiments, calibration (for example, as shown in in FIGS. 4 and 7) may be periodically repeated since characteristics of valve 210 may change with time. Controller assembly 106 may automatically initiate calibration, for example, every month, since the characteristics of valve 210 (for example, the hardening of a rubber seal) may change with time. Also, calibration may be invoked via a command, for example via thermostat interface 204, when valve 210 is replaced or maintained.

Figure 8:
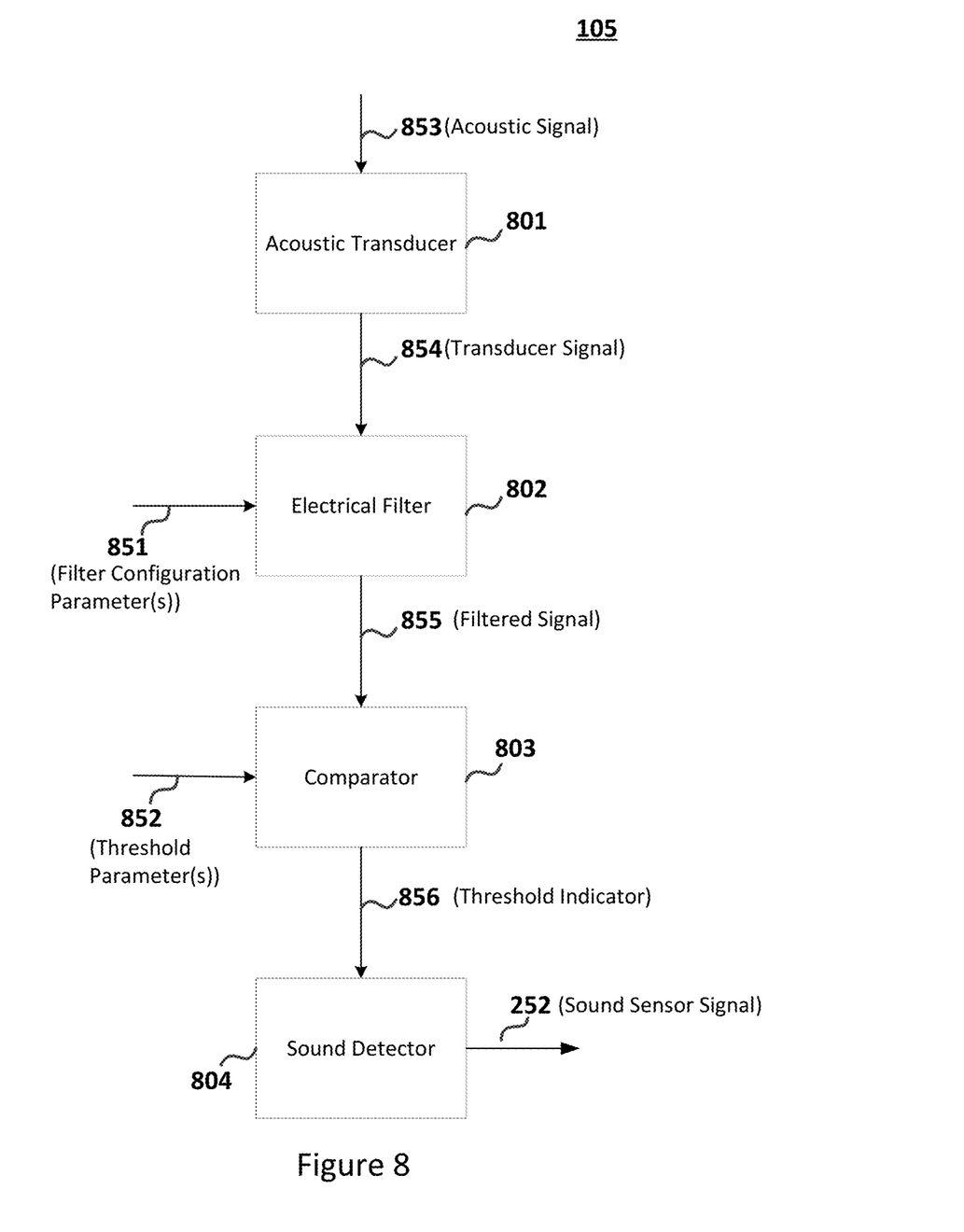
FIG. 8 shows a sound sensor in in accordance with an embodiment.

FIG. 8 shows embodiment 800 of sound sensor 104.

As discussed below, sound sensor 800 processes acoustic signal 853 over the audible range 20 Hz to 20 KHz. Sound sensor 800 detects a rushing water sound when a sound change (corresponding to an "open" sound) is identified as the valve is opened from the closed position. The identified sound change can be verified by then closing the valve to determine of the previously identified sound change (the "open" sound) is no longer detected by sound sensor 800.

Sound sensor 800 may be mounted on or near the body of valve 210 so that sound sensor can receive acoustic signal 853 generated by water flowing through valve 210 at acoustic transducer 801. Transducer 801 converts acoustic signal 853 into an electrical signal (transducer signal 854). Electrical filter 802 processes (shapes) the electrical signal according to filter configuration parameter(s) 851. For example, filter 802 may shape transducer signal 854 passing a specific frequency band that is associated with a rushing water sound while blocking other frequency bands.

Filtered signal 855 (the shaped signal) is then compared by comparator 803 to threshold parameter(s) 852. Comparator 803 generates threshold indicator 856 to indicates whether the threshold is exceeded. If so, sound detector 804 detects a rushing water sound and generates sound sensor signal 252 that is indicative of the sound detection.

FIG. 9 shows flowchart 900 for a calibration phase of controller assembly 106. Process 900 utilizes signals both from temperature sensor 104 and sound sensor 105.

As with flowcharts 400 and 700 as shown in FIGS. 4 and 7, respectively, process 900 determines whether to enter the calibration at block 901. If so, block 902 determines whether heat is detected. If so, the current actuator position is stored at block 905 and the operational phase is entered at block 906.

On the other hand, if heat is not detected at block 902, process 900 determines whether a rushing sound is detected at block 903. If so, the current actuator position is stored at block 905 and the operational phase is entered at block 906.

The actuator position is advanced at block 904 only when both heat and sound are not detected. In other words, only one signal (either sound sensor signal 252 or temperature sensor signal 253) needs to be indicative of a minimum water flow to detect the minimum water flow. Because both heat and sound detection are incorporated with this approach, process 900 may offer greater robustness than process 400 (which uses only heat detection) or process 700 (which uses only sound detection) when determine when minimum water flow occurs.

While not explicitly shown, some embodiments may require both sound sensor signal 252 and temperature signal 253 to be indicative of a minimum water flow to detect the minimum water flow. This approach may reduce the probability of having a false detection of minimum water flow.

FIG. 10 shows flowchart 1000 for an operational phase of controller assembly 106. As shown in FIG. 3, controller assembly 106 enters the operational phase after completing the calibration phase.

At block 1001, controller assembly 106 accesses the stored actuator position corresponding to essentially minimum water flow from memory device 207 (as shown in FIG. 2).

At block 1002, controller assembly 106 determines whether the measured temperature is within desired bounds as indicated by thermostat signal 251. For example, when in the heating mode, controller assembly 106 may determine whether the measured temperature of the environmental entity (for example, a room) is above a temperature setpoint plus an offset. (The offset may a predetermined value that provides a hysteresis to prevent frequent cycling of a heating system.) If so, controller assembly 106 closes/maintains the valve in the closed position (for example where the actuator position is at a minimum distance) at block 1003. If not, at block 1004 controller assembly 106 instructs movement actuator 202 to position valve 210 to an adjustable position to obtain an adjusted flow between the minimum flow and the maximum flow so that hydronic emitter 101 provides the desired power output.

Controller assembly 106 then waits until a sampling timing duration expires at block 1005 and then repeats the process at block 1002 to obtain a subsequent measured temperature from thermostat signal 251.

When in the cooling mode, controller assembly 106 may determine whether the measured temperature is below a temperature setpoint minus an offset.

Controller assembly 106 adjusts the water flow at blocks 1002, 1004, and 1005 until the measured temperature is within bounds.

As can be appreciated by one skilled in the art, a computer system with an associated computer-readable medium containing instructions for controlling the computer system can be utilized to implement the exemplary embodiments that are disclosed herein. The computer system may include at least one computer such as a microprocessor, digital signal processor, and associated peripheral electronic circuitry.

What is claimed is:

1. A heating/cooling system comprising:
    at least one controller assembly controlling the heating/cooling system, the at least one controller assembly including:
        a movement actuator configured to connect to a valve in order to control water flow through a hydronic emitter;
        a control interface configured to obtain a control signal;
        a sensor interface configured to interface to at least one sensor, wherein the at least one sensor comprises a sound sensor mounted in proximity to a flow pipe of the hydronic emitter; and
        a computer device comprising:
        a processor;
        a first memory device;
        a second memory device; and
        a first memory device storing computer-readable instructions that, when executed by the processor, cause the at least one controller assembly to perform:
        during a calibration phase:
        controlling, based on the sensor information, the movement actuator to adjust the valve resulting in a minimum water flow through the hydronic emitter;
        obtaining sensor information from the at least one sensor as the movement actuator advances the valve, wherein the sensor information includes a sound signal;
        detecting, from the sound signal, when a rushing sound of water occurs at a first actuator position, wherein the first actuator position results in the minimum water flow; and
        setting a stored actuator position to the first actuator position;
        during an operational phase:
        controlling an adjusted water flow through the hydronic emitter over a full range of flow rate, wherein the full range spans from the minimum water flow to a maximum water flow and wherein the stored actuator position of the movement actuator corresponds to the minimum water flow and wherein the maximum water flow occurs when the valve is fully opened.

2. The heating/cooling system of claim 1, wherein the first memory device storing computer-readable instructions that, when executed by the processor, further cause the at least one controller assembly to perform:
    repeating the obtaining and the controlling during the calibration phase until the rushing sound is detected.

3. The heating/cooling system of claim 1, wherein the first memory device storing computer-readable instructions that, when executed by the processor, further cause the at least one controller assembly to perform:
    adjusting, through the movement actuator, the valve to have the adjusted water flow within a full range of flow rate, wherein the adjusted water flow rate provides a desired power output obtained from the hydronic emitter for an environmental entity.

4. The heating/cooling system of claim 1, wherein the at least one sensor comprises a temperature sensor mounted in proximity to a flow pipe of the hydronic emitter and wherein the first memory device storing computer-readable instructions that, when executed by the processor, further cause the at least one controller assembly to perform:
    obtaining a temperature signal from the temperature sensor as the movement actuator advances the valve;
    detecting, from the temperature signal, when a sensor temperature changes; and
    setting the stored actuator position to a second actuator position when the sensor temperature change is detected.

5. The heating/cooling system claim 4, wherein the first memory device storing computer-readable instructions that, when executed by the processor, further cause the at least one controller assembly to perform:
    closing the valve by the movement actuator; and
    waiting a predetermined stabilization time duration before performing the controlling the movement actuator.

6. The heating/cooling system claim 1, wherein the first memory device storing computer-readable instructions that, when executed by the processor, cause the at least one controller assembly to perform:
    incrementally advancing the valve through the movement actuator; and
    in response to the incrementally advancing, obtaining the sensor information from the at least one sensor.

7. The heating/cooling system of claim 1 comprising the sound sensor, wherein the sound sensor comprises:
    an acoustic transducer configured to transform an acoustic signal generated by the rushing sound of water through the valve to an electrical signal;
    an electrical filter configured to shape the electrical signal based on at least one configuration parameter to match a characteristic of the rushing sound of water through the valve;
    a comparator configured to compare the shaped electrical signal to at least one threshold parameter; and
    a sound detector configured to detect whether a sound generated by the rushing sound of water through the valve is present.

8. A method for controlling water flowing through a hydronic emitter of a heating/cooling system, the method comprising:
    during a calibration phase:
        incrementally advancing a valve via a movement actuator, wherein the valve controls the water flowing through the hydronic emitter;
        in response to the incrementally advancing the valve, obtaining sensor information from at least one sensor;

detecting, based on the sensor information, an actuator position of the movement actuator resulting in an essentially minimum water flow through the hydronic emitter;
storing the actuator position where the essentially minimum water flow occurs;
receiving a first sound signal from a sound sensor as the valve is advanced through the movement actuator;
detecting, from the first sound signal, when a first rushing water sound occurs;
obtaining a first actuator position of the movement actuator when the first rushing water sound is detected; and
setting the stored actuator position based on the first actuator position; and
during an operational phase:
adjusting, through the movement actuator, the valve to have an adjusted flow rate within a full range of flow rate, wherein the full range of flow rate is between the essentially minimum water flow and a maximum water flow and wherein the adjusted flow rate provides a desired power output obtained from the hydronic emitter for an environmental entity and wherein the maximum water flow occurs when the valve is fully opened.

9. The method of claim 8 further comprising:
returning the valve to a fully closed position;
receiving a second sound signal from the sound sensor as the valve is advanced;
detecting, from the second sound signal, when a second rushing water sound occurs;
obtaining a second actuator position of the movement actuator when the second rushing water sound is detected; and
modifying the stored actuator position based on the second actuator position.

10. The method of claim 9 further comprising:
when a difference between the first and second actuator positions exceed a predetermined limit, generating an error signal.

11. The method of claim 10 further comprising:
reconfiguring at least one detection parameter;
receiving a third sound signal from the sound sensor as the valve is advanced;
detecting, from the third sound signal, when a third rushing water sound occurs;
obtaining a third actuator position of the movement actuator when the third rushing water sound is detected; and
modifying the stored actuator position based on the third actuator position.

12. The method of claim 8 further comprising:
when a measured temperature from a thermostat is not within a desired temperature range, allowing the adjusted flow rate through the valve; and
when the measured temperature is within the desired temperature range, stopping water flow through the valve.

13. The method of claim 8 further comprising:
receiving a temperature signal from a temperature sensor as the valve advances;
detecting, from the temperature signal, when a sensor temperature changes;
obtaining a fourth actuator position of the movement actuator when the sensor temperature changes; and
modifying the stored actuator position based on the fourth actuator position.

14. The method of claim 13 further comprising:
setting the stored actuator position to the fourth actuator position when the fourth actuator position occurs before the first actuator position; and
setting the stored actuator position value to the first actuator position when the first actuator position occurs before the fourth actuator position.

15. The method of claim 8 further comprising:
obtaining a temperature signal from a temperature sensor as the valve is advanced;
detecting, from the temperature signal, when a sensor temperature changes; and
setting the stored actuator position when the sensor temperature change is detected.

16. The method of claim 15 further comprising:
advancing the valve an incremental amount during a current sampling interval;
obtaining a current temperature from the temperature sensor;
comparing the current temperature with a previous temperature from a previous sampling interval; and
when the current temperature exceeds the previous temperature by at least a predetermined amount, setting the stored actuator position at a current actuator position.

17. The method of claim 8 further comprising:
returning the movement actuator to a closed position; and
verifying that the first rushing water sound is not detected.

18. A heating/cooling system comprising:
at least one controller assembly controlling the system, the at least one controller assembly including:
a movement actuator configured to connect to a valve in order to control water flow through a hydronic emitter;
a control interface configured to obtain a control signal from a thermostat, the control signal indicative of a measured temperature of an environmental entity;
a sensor interface configured to interface to a sound sensor; and
a computer device comprising:
a processor;
a first memory device;
a second memory device; and
the first memory device storing computer-readable instructions that, when executed by the processor, cause the at least one controller assembly to perform:
during a calibration phase:
obtaining a sound signal from the sound sensor through the sensor interface;
detecting, from the sound signal, when a rushing sound of water occurs at an actuator position of the movement actuator, wherein a minimum water flow occurs through the valve; and
storing, at the second memory device, the actuator position of the movement actuator where the minimum water flow occurs;
during an operational phase:
when the measured temperature, as provided by the thermostat, is not within a desired temperature range, retrieving the stored actuator position from the second memory device; and
controlling an adjustable water flow through the hydronic emitter over a full range of flow rate, wherein the full range spans from the minimum water flow to a maximum water flow and wherein the stored actuator position of the movement actuator corresponds to the minimum water flow and wherein the maximum water flow occurs when the valve is fully opened; and when the measured temperature, as provided by the thermostat, is within the desired temperature range, terminating the adjustable water flow.

\* \* \* \* \*